W. J. DAVIS.
ELECTROMAGNETIC MEASURING INSTRUMENT.
APPLICATION FILED JUNE 20, 1913.
1,123,855. Patented Jan. 5, 1915.
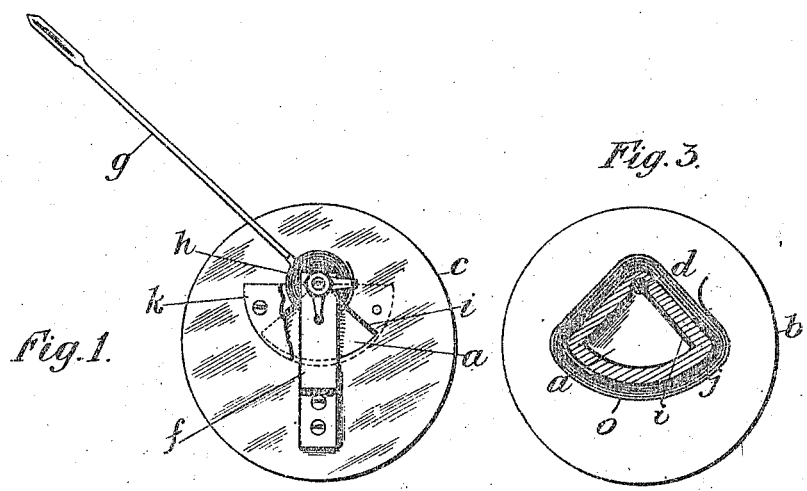
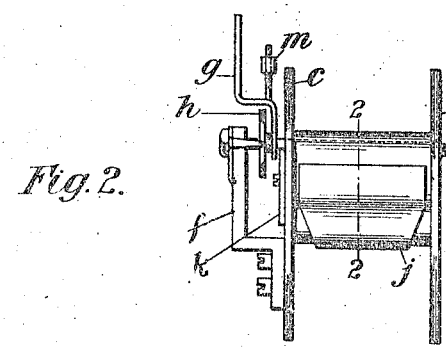
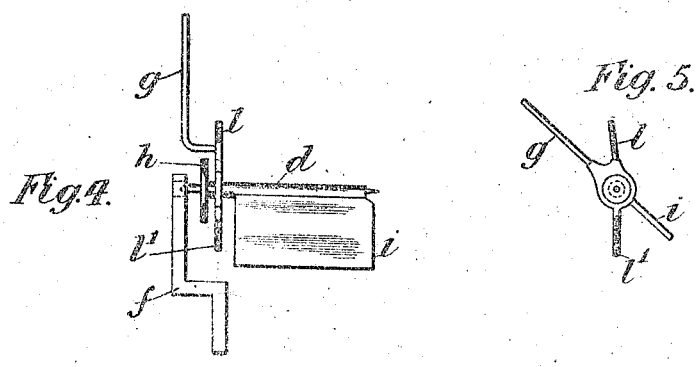

UNITED STATES PATENT OFFICE.

WILLIAM JOSEPH DAVIS, OF ENFIELD, ENGLAND, ASSIGNOR TO EDISON AND SWAN UNITED ELECTRIC LIGHT COMPANY LIMITED, OF LONDON, ENGLAND.

ELECTROMAGNETIC MEASURING INSTRUMENT.

1,123,855.   Specification of Letters Patent.   Patented Jan. 5, 1915.

Application filed June 20, 1913. Serial No. 774,941.

*To all whom it may concern:*

Be it known that I, WILLIAM JOSEPH DAVIS, a subject of the King of Great Britain, and residing at Enfield, Middlesex, England, have invented certain new and useful Improvements in Electromagnetic Measuring Instruments, of which the following is a specification.

This invention relates to improvements in electromagnetic measuring instruments, such as voltmeters, ammeters and the like, of the kind wherein the instrument is made dead beat or aperiodic without providing a separate air damping chamber for this purpose. By the peculiar construction and disposition of the parts of the instrument greater sensitiveness is obtained, than has hitherto been practicable, resulting in a very low watt consumption, and giving a uniformity of scale.

According to the present invention the damping chamber is contained within the coil through which the current is passed to excite the irons in the usual way, and by the repulsion between them to indicate the characteristics of the current under consideration. The moving iron attached to the pointer itself constitutes the plunger or vane for the damping chamber, and in this way an extra damping chamber and plunger are rendered unnecessary and an economy of space and a reduction of the number of moving parts is effected.

An instrument embodying my invention is illustrated in the accompanying drawings in which—

Figure 1 is a front elevation of the instrument, Fig. 2 a side elevation from the right hand side of Fig. 1, with the coil removed, Fig. 3 a section taken on line 2 2 Fig. 2 looking to the right, Fig. 4 a side elevation of the moving parts removed from the rest of the instrument, and Fig. 5 a detail view hereinafter referred to.

The drum upon which the coil $o$ is wound has a hollow core $a$ between the flanges $b$ and $c$ which core is substantially sector shaped externally and internally. Within the core and along the apex of the sector lies the shaft $d$ having one end mounted in a bearing $e$ screwed into the rear flange $b$ and the other end mounted in a bracket $f$ secured to the front flange $c$. This shaft $d$ carries the usual pointer $g$ which passes over the measuring scale, and the spring $h$ for returning the pointer to zero. Depending from the shaft $d$ is a vane $i$ of thin iron (shown more particularly in Figs. 1, 3, 4 and 5) which extends almost from end to end of the hollow core of the drum but just clears the ends. The lower edge of the vane $i$ lies just clear of the inner side of the curved wall of the core $a$, and as the shaft $d$ lies in the apex of the sector, when the shaft is rotated the vane $i$ sweeps across the interior of the hollow core with its edge and ends always close to the walls of the chamber containing it. The vane $i$ forms one of the irons of the instrument, and the other iron $j$ is preferably placed outside the core $a$. With a core of sector shaped exterior as in the instrument illustrated, the outer iron $j$ is preferably arranged in the position shown, with one end bent up around the core, at the side where the inner iron rests when the pointer is at zero. The chamber containing the iron $i$ is closed by a plate $k$ secured over the opening through which the vane is inserted. When the instrument is excited the repulsion between the irons $i$ and $j$ causes the former to sweep across the chamber containing it, and by reason of the resistance due to the small air gap between the moving vane and the curved side of the chamber the movement of the instrument will be dead beat. Instead of the spring $h$ a weight may be used to return the pointer to zero and Fig. 5 shows arms $l$, $l'$ on the shaft of the instrument to either of which a weight may be attached, according as the instrument is to be used with the pointer pointing upward or downward. An adjustable weight $m$ (Fig. 2) is furnished to balance the vane exactly against the pointer and put the movement in equilibrium.

Owing to the comparatively long radius from which the moving iron $i$ swings extreme sensitiveness is obtained and the bent up portion of the outer iron $j$ lying at one side of the edge of the vane gives a sidewise thrust of repulsion to the moving iron. This likewise adds to the sensitiveness of the instrument.

The iron $j$ is preferably placed in known manner on the outside of the core $a$ as this arrangement has the effect of bringing both irons nearer to the inner windings of the coil $o$. The sector shaped chamber may be formed by the winding of the coil o alone, but the use of a drum with a core, as described, is preferred.

The advantages derived from the use of a segmental chamber for damping purposes are that the resistance to the vane within the segmental chamber is relatively great as compared with other forms of chambers heretofore employed, such as circular chambers. In a circular chamber the edge of the vane is not close to the wall of the chamber but must necessarily be spaced therefrom throughout the entire circumference of the vane and thus the air easily escapes about the edges of the vane behind the pivot thereof. In the segmental chamber the vane which is of corresponding shape as above described has its edge close to the inner wall of the chamber and its pivot point is located in the apex of the chamber so that air cannot easily escape about the pivotal axis of the vane.

What I claim as my invention is:

1. An electromagnetic measuring instrument comprising a coil having within it a chamber of substantially sector shaped section with a vane constituting the moving iron pivoted therein along the apex of the sector and a fixed iron lying partly along the curved side of the sector and partly turned up along one flat side, around the free edge of the moving iron when in the zero position.

2. An electro-magnetic measuring instrument comprising a hollow core having a chamber therein and being substantially sector shaped in cross section, a coil wound upon said core, a vane pivoted in said chamber along the apex thereof, and constituting a moving iron, and a fixed iron located on the outside of the core and lying partly along the curved side of the sector shaped core and partly turned up along one of the flat sides thereof around the free edge of the moving iron when in zero position.

3. An electro-magnetic measuring instrument comprising a drum, flanges on the ends of said drum, a hollow core between said flanges having a chamber therein and being of substantially sector shaped in cross section, a coil wound upon said core, a shaft journaled at its opposite ends and lying within said core at the apex thereof, a vane fixed upon said shaft within said chamber and constituting a moving iron, a removable plate at one end of said core for closing the vane in said chamber, a permanent closure at the opposite end of said core for housing said vane, a pointer secured to said shaft for movement with said vane, means for normally holding said pointer in zero position, and a fixed iron disposed between the core and the coil and lying partly along the curved side of the sector shaped core and being partly turned up along one flat side of the core around the free edge of the moving iron when in zero position.

In testimony whereof I have affixed my signature in presence of two witnesses.

WILLIAM JOSEPH DAVIS.

Witnesses:
LOVELESS REDDIE,
J. W. THOMPSON.